Patented Jan. 31, 1950

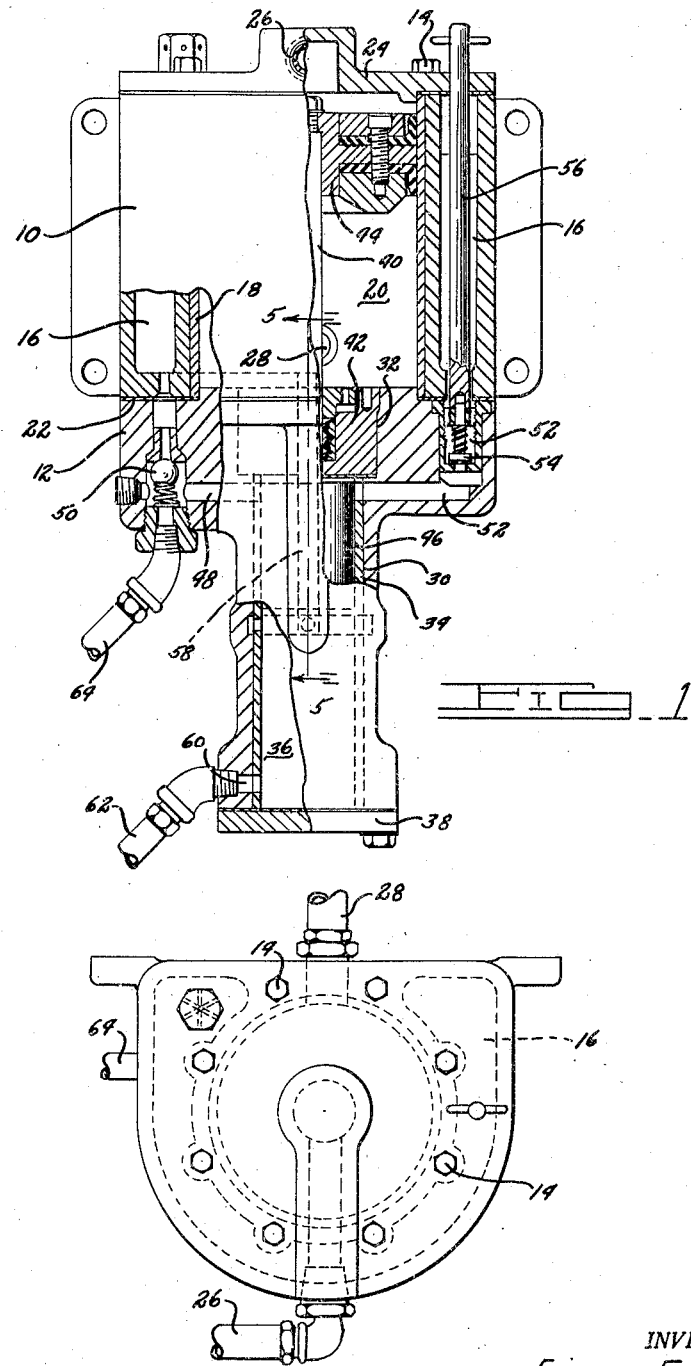

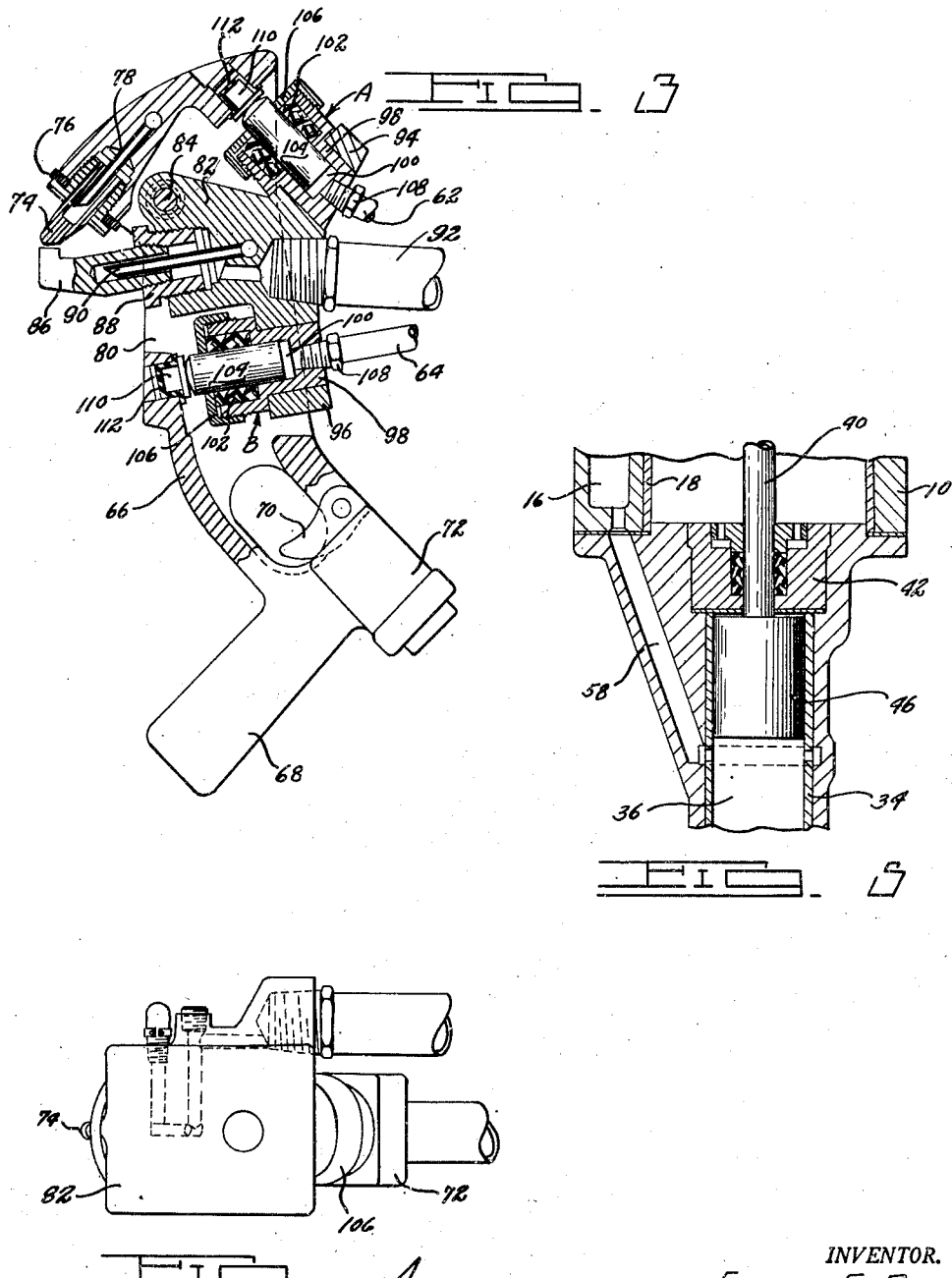

2,496,104

UNITED STATES PATENT OFFICE 2,496,104

HYDROPNEUMATIC PRESSURE BOOSTER AND WELDING GUN

Elmer F. Paner, Detroit, Mich.

Application July 11, 1946, Serial No. 682,816

2 Claims. (Cl. 219—4)

1

This invention relates to welding equipment and more particularly to electric welding apparatus of the spot welding type in which repeat operations are effected by fluid pressure in controlling the movement of electrodes of a spot welding appliance.

An object of the present invention is to provide a double acting, hydraulically operated apparatus which eliminates destructive burning and pitting at the point of the weld by reducing arcing to a minimum.

Another object of the invention is to provide a pressure booster mechanism for the hydraulically operated electrode members.

Another object of the invention is to apply a uniform pressure between the electrode at all times regardless of variations in the thickness of the parts being united by the weld or the wearing away of the electrode tips.

A further object of the invention is to provide hydraulic pressure means for advancing the welding electrodes toward each other and hydraulic pressure means for retracting the electrodes from welding position.

A still further object of the invention is to provide an improved apparatus for accomplishing this purpose and which permits electric welding operations to be effected more rapidly, thoroughly and easily than has been heretofore possible in a manner permitting better results for the amount of current consumed and also increase the output of the machine.

Other objects and advantages of the invention will more fully appear from the following description taken in connection with the accompanying drawings in which:

Fig. 1 is a side view, partly in section and partly in elevation, of the pressure booster portion of the welding equipment;

Fig. 2 is a top plan view of Fig. 1 with a diagrammatic illustration of the pressure input means.

Fig. 3 is a cross sectional view of a portable welding tool operable by the booster mechanism shown in Fig. 1;

Fig. 4 is a top plan view of Fig. 3 and;

Fig. 5 is a fragmentary sectional view taken on line 5—5 of Fig. 1.

Referring to the illustrated embodiment of the invention, the welding apparatus comprises a booster mechanism shown in Figs. 1, 2 and 5 and a portable welding tool, shown in Figs. 3 and 4 which is operable by the booster mechanism.

The booster mechanism comprises a two part housing, upper portion 10 and lower portion 12, the two portions being secured together by bolts 14. The upper portion 10 is provided with a fluid reservoir 16, partially surrounding a cylindrical sleeve 18 forming a cylinder 20. The lower open end of the cylinder is closed by the lower portion 12 of the housing with a suitable gasket 22 between the meeting faces of the housing portions 10 and 12. The upper open end of the cylinder 20 is closed by a head 24 having a fluid inlet passage 26. An air outlet passage is shown at 28 in the lower portion of the housing 10.

The lower portion 12 of the housing has a cylindrical bore 30, longitudinally therethrough and is counter-bored at 32. A sleeve 34 is press fitted in the bore 30 forming a cylinder 36. The lower portion 12 is closed by a cap 38.

A piston rod 40, is slidably mounted in a packing assembly 42 press fitted into the counter bore 32. The end of the piston rod in the cylinder 20 is provided with a piston 44 for reciprocation in the cylinder 20 and the opposite end of the piston rod 40, within the cylinder 36, is provided with a piston 46 for reciprocation in the cylinder 36.

At the upper end of the cylinder 36 and above the piston 46 is a passage 48 communicating with the reservoir 16 through ball check valve 50. The upper end of the cylinder 36 is also provided with a passage 52 leading to the reservoir 16. The passage 52 is provided with an adjustable spring loaded valve 54, the latter being adjustable by rod 56 projecting through the head 24. This permits a volumetric differential between the pressures in the cylinder 36 at the top of the piston 46 and a smaller chamber, hereinafter more fully referred to.

Referring to Fig. 5 there is a passage 58 forming a communication between the reservoir 16 and the cylinder 36. This passage communicates with the cylinder 36 at a position below the piston 46 when the latter is at its upper stroke so that fluid may flow from the reservoir 16 into the cylinder 36.

The lower end of the cylinder 36 has a passage 60 communicating with a flexible connection 62 leading to the welding tool. The passage 48 is connected to a flexible conduit 64 leading to the welding tool.

From the above description it will be understood that when a fluid under pressure such as air, is supplied to the cylinder 20, above the piston 44, through the inlet passage 26, the piston 44 and rod 40 are moved downwardly, exhausting the fluid below the piston through passage 28. Suitable mechanism for controlling flow of fluid pressure, not shown, may be provided. When the fluid pressure is reversed by the control mechanism, that is, by supplying a fluid pressure through the passage 28 and exhausting through passage 26, the piston is moved upwardly. Since the piston rod 40 connects the pistons 44 and 46, the latter moves in unison with the movement of the former. When the piston 46 moves downwardly in the cylinder 36 the fluid pressure below the piston 46 is forced through the flexible conduit 62 and drawn into the cylinder 36, above the piston 46, through conduit 64 and vice-versa upon reverse movement of the piston 46.

Referring now to Figs. 3 and 4, the welding tool is shown having a body portion 66 with a handle 68 and a control trigger 70 for a switch 72. One electrode 74 is removably secured to one end of the body portion 60 by nut 76 and a fluid conduit 78 is provided for cooling the electrode.

The body portion 66 has a slotted portion 80, between the handle 68 and the outer portion of the body, which receives a carrier 82 pivotally supported at 84 to the body portion 66 between the side walls thereof. The carrier 82 receives an electrode 86 held therein by nut 88. A fluid conduit 90 is provided for cooling the electrode.

The usual cable for conducting the welding current and the cooling liquid is shown at 92 but since they form no part of the present invention, the details thereof are not shown, the same being of common construction which is well known in the welding art.

The carrier 82, at opposite sides of the pivot 84 is provided with oppositely disposed lugs 94 and 96, each of which receives piston and cylinder assemblies A and B. Each assembly comprises a fitting 98 adapted to be press fitted in the lugs 94, 96. The fitting 98 has a cylinder 100 with a counter bored portion for receiving a packing 102 around a piston 104 in the cylinder 100. The piston 104 projects outwardly beyond the outer face of a packing nut 106 screw threaded to the outer periphery of the fitting 98. The conduits 62 and 64 are respectively connected to the cylinders 100 by nuts 108.

Wear plugs 110, having insulator members 112, are press fitted into the body portion 66 at points axially aligned with the pistons 104.

When it is desired to make a weld, the trigger 70 is pressed, completing an electrical circuit, which controls an air valve, not shown. Fluid pressure is then supplied to the cylinder 20, above the piston 44, through inlet passage 26. This pressure forces the piston rod 40 and piston 46 downwardly, producing a fluid pressure in the cylinder 36 and in cylinder 100 of the assembly A through conduit 62. This causes the carrier 82 and electrode 86 to swing clockwise on the pivot 84 bringing the electrodes 86 and 74 toward each other for welding a work piece therebetween. As the carrier is pivoted clockwise, the fluid in the cylinder 100 of the assembly B is displaced through conduit 64 to the cylinder 36 above the piston 46. Since the piston rod 40 causes a difference in volume of displaced fluid, the valve 54 compensates for the difference in volume between the cylinder chambers above and below the piston 46.

When the trigger 70 is released, air pressure is supplied to the lower surface of the piston 44, through passage 28. This forces the piston 46 upwardly creating a pressure in the cylinder 36 above the piston 46, which is delivered to the cylinder 100 in assembly B through conduit 64, moving the carrier 82 in a counterclockwise direction to separate the electrodes 74 and 86.

From the above, it will be apparent that the construction provides hydraulic pressure means for advancing and retracting the electrodes without the use of springs or other mechanism.

It will be understood that various changes including the size, shape, and arrangement of parts may be made without departing from the spirit of my invention, and it is not my intention to limit its scope other than by the terms of the appended claims.

I claim:

1. An electric welding apparatus comprising a body portion, having a normally fixed electrode, a pivoted carrier on said body portion, an electrode carried by said carrier, a pair of cylinders on said carrier, one each at the opposite sides of the pivot of said carrier, pistons in said cylinders having one end in contact with said body portion, and fluid conduits in communication with said cylinders for alternately conducting a fluid pressure to each of said cylinders.

2. An electric welding apparatus, comprising a body portion having a normally fixed electrode, a carrier pivoted on said body portion, an electrode carried by said carrier, interchangeable cylinder and piston assemblies mounted on said carrier one on each side of the pivotal connection between said body and said carrier, the outer end of said pistons being in contact with said body portion, and fluid pressure means for moving said pistons relative to said cylinders.

ELMER F. PANER.

REFERENCES CITED

The following references are of record in the file of this patent:

UNITED STATES PATENTS

| Number | Name | Date |
|---|---|---|
| 1,153,384 | Heany | Sept. 14, 1915 |
| 1,315,876 | Southall | Sept. 9, 1919 |
| 1,645,705 | Ledwinka | Oct. 18, 1927 |
| 2,063,258 | Martin | Dec. 8, 1936 |
| 2,085,105 | Lex | June 29, 1937 |
| 2,126,490 | Martin | Aug. 9, 1938 |
| 2,283,826 | Soehner | May 19, 1942 |
| 2,337,022 | Beiderman | Dec. 21, 1943 |
| 2,341,459 | Martin | Feb. 8, 1944 |

FOREIGN PATENTS

| Number | Country | Date |
|---|---|---|
| 525,707 | Great Britain | Sept. 3, 1940 |